(12) United States Patent
Huang

(10) Patent No.: US 11,334,195 B2
(45) Date of Patent: May 17, 2022

(54) OPTICAL DETECTION APPARATUS

(71) Applicant: Shanghai Harvest Intelligence Technology Co., Ltd., Shanghai (CN)

(72) Inventor: Jiandong Huang, Shanghai (CN)

(*) Notice: Subject to any disclaimer, the term of this patent is extended or adjusted under 35 U.S.C. 154(b) by 0 days.

(21) Appl. No.: 17/035,772

(22) Filed: Sep. 29, 2020

(65) Prior Publication Data

US 2021/0141487 A1 May 13, 2021

Related U.S. Application Data

(63) Continuation of application No. PCT/CN2018/085783, filed on May 7, 2018.

(30) Foreign Application Priority Data

Apr. 2, 2018 (CN) .......................... 201810283651.4

(51) Int. Cl.
*G06F 3/042* (2006.01)
*H01L 27/32* (2006.01)
(Continued)

(52) U.S. Cl.
CPC ........ *G06F 3/0421* (2013.01); *G02F 1/13318* (2013.01); *G02F 1/13454* (2013.01); *G06F 3/0412* (2013.01); *H01L 27/323* (2013.01); *H01L 27/3211* (2013.01); *H01L 27/3244* (2013.01); *G06F 1/163* (2013.01)

(58) Field of Classification Search
CPC . G02B 27/00; G02F 1/13318; G02F 1/13454; G02F 2203/11; G06F 1/163; G06F 21/32; G06F 3/0412; G06F 3/0421; H01L 27/14; H01L 27/144; H01L 27/3211; H01L 27/3213; H01L 27/323; H01L 27/3234; H01L 27/3244; H01L 31/09

See application file for complete search history.

(56) References Cited

U.S. PATENT DOCUMENTS

2011/0227138 A1 9/2011 Haddad et al.
2011/0260059 A1* 10/2011 Jiang ................. H01L 27/14625
250/330

(Continued)

FOREIGN PATENT DOCUMENTS

CN 107770309 A 3/2018

*Primary Examiner* — Afroza Chowdhury

(57) ABSTRACT

According to the invention, the photosensitive module is disposed below the display unit and is located on or near the optical axis for imaging of physiological feature information of the user, so that compared with a structure having a camera separately disposed on the peripheral edge of a display, the apparatus of the invention can timely capture the physiological feature information (such as eye motion information) of the user, shorten the detection response time and improve user experience. In addition, the photosensitive module is disposed below the display unit, and the display unit with infrared pixels emits infrared light, so that compared with the structure having the camera separately disposed outside the display, the overall thickness of mobile devices can be effectively decreased, wearable devices or mobile devices are lighter and thinner, and the apparatus is more suitable for flexible wearable devices or mobile devices and can meet market requirements.

20 Claims, 9 Drawing Sheets

(51) Int. Cl.
 *G02F 1/133* (2006.01)
 *G02F 1/1345* (2006.01)
 *G06F 3/041* (2006.01)
 *G06F 1/16* (2006.01)

(56) References Cited

U.S. PATENT DOCUMENTS

| | | |
|---|---|---|
| 2014/0145976 A1 | 5/2014 | Tang et al. |
| 2015/0015478 A1 | 1/2015 | Hoffman |
| 2017/0078513 A1* | 3/2017 | Chang .................. G06F 3/0304 |
| 2018/0196985 A1 | 7/2018 | Ling et al. |
| 2019/0080138 A1 | 3/2019 | Gao et al. |
| 2020/0285343 A1 | 9/2020 | Ding et al. |

* cited by examiner

Top view of photosensitive film

Side view of photosensitive film

===== G :   Gate

Top view of photosensitive film

Side view of photosensitive film

Film substrate

≡≡≡ G : Gate

▦ Insulating layer

OPTICAL DETECTION APPARATUS

BACKGROUND OF THE INVENTION

1. Field of the Invention

The present invention relates to the field of optics, in particular to an optical detection apparatus with integrated infrared pixels in a display.

2. Description of the Prior Art

The current display panel technology, whether it is a liquid crystal display (LCD) or an active matrix organic light-emitting diode (AMOLED) display screen, both of them scan and drive a single pixel through a film transistor (TFT) structure to realize the display function of the on-screen pixel array. The main structure for forming the TFT switching function is a Metal-Oxide-Semiconductor field effect transistor (MOSFET), and the well-known semiconductor layer is mainly made of amorphous silicon, polycrystalline silicon, indium gallium zinc oxide (IGZO), or an organic compound mixed with carbon nano materials. The structure of a photo diode may also be ready by such semiconductor materials and the production equipment is also compatible with the production equipment of the TFT array, so the prepared photodiode can be directly integrated with TFT and use TFT to scan and drive the photodiode. Therefore, the TFT photodiode has started to be produced by a TFT array preparation method in recent years and is widely used in X-ray sensing flat panel devices, such as those described in the patents CN 103829959B and CN 102903721B of the People's Republic of China.

In contrast to image sensor devices made of traditional crystalline materials, the band gap of the TFT Photo-detecting array film material mainly uses visible light as the main absorption range, so it is more susceptible to interference from ambient visible light to form noise. Thus, the signal-to-noise ratio (SNR) is low. Limited by this, the initial application of the TFT light sensing array is mainly based on X-ray sensing flat panel devices. The main reason is that X-rays are short-wavelength light with great accuracy. The X-ray image first enters the light wavelength conversion material on the sensing plate. X-ray image is converted into longer wavelength visible light, and then the visible light is directly transmitted to the TFT Photo-detecting array film in the sensing flat panel to avoid the noise interference caused by the visible light of the surrounding environment, such as those described in the patents CN 103829959B and CN 102903721B of the People's Republic of China.

If we want to realize the well-known photosensitive film for visible light in the traditional display, capturing useful optical signal from low signal-to-noise ratio environment will be very difficult, as difficult as single-photon imaging, because of the following problems: the image distortion caused by diffraction due to the aperture of the display pixel, the optical signal penetrating through the multi-layer structure of the display screen, and the coexisting optical display signal and touch sensing signal. Thus, the original image can only be resolved by algorithm reconstruction according to light wave theory. In order to avoid this technical difficulty, it is well known that if the photosensitive film for visible light is mounted in the traditional display, additional optical enhancement devices will be required, or only the photosensitive film will be mounted in the side of the display screen, and the image reconstruction will be carried out by using the non-vertical reflective light that reaches the side of the display screen, for example, the patent CN101359369b of the People's Republic of China.

It can be seen from the above existing technologies that are familiar with photosensitive thin films that the existing optical detection apparatus have low photoelectric conversion rate and cannot meet the requirements of large-area film array devices. In order to configure the light detection array film in the display screen structure, the light detection structure needs to be improved to expand the detection range of photosensitive wavelength and improve the corresponding photoelectric conversion quantum efficiency. In addition, the structure of the existing optical detection apparatus is to recognize the eye or iris image through the off screen camera structure when performing eye tracking, iris recognition and other operations. Taking eye tracking as an example, due to the position of the off-screen camera deviates from the optical axis, there are some problems such as low accuracy, long response time and delay in the acquisition of eye information, which brings adverse sensory experience to users, and even causes dizziness, vomiting and other symptoms.

SUMMARY OF THE INVENTION

Therefore, it is necessary to provide a new optical detection apparatus and method, which can solve the problems such as low accuracy of captured image information, long response time, screen delay and poor user experience when the existing optical detection device is applied to applications such as eye tracking.

In order to achieve the above-mentioned purpose, an optical detection apparatus including a display integrated with an infrared pixel is provided in the present disclosure, the apparatus includes a display unit and a photosensitive module;

The display unit includes a plurality of pixel regions, the pixel region is provided with a display pixel, at least one of the plurality of pixel regions includes an infrared pixel, the display pixel is configured to emit a display signal, and the infrared pixel is configured to emit an infrared signal;

The photosensitive module is used to detect the infrared signal.

In some embodiment, multiple photosensitive regions, every photosensitive region includes a pixel circuit and a photosensitive component.

In some embodiment, the photosensitive component includes an infrared photosensitive diode or an infrared photosensitive transistor, and/or the pixel circuit includes at least one thin film transistor.

In some embodiment, more than one of the plurality of the pixel regions includes the infrared pixel.

In some embodiment, the display pixel includes RGB pixel components.

In some embodiment, the photosensitive component includes a photosensitive diode, the photosensitive diode includes a p-type semiconductor layer, an i-type semiconductor layer and an n-type semiconductor layer which are stacked from top to bottom, and the i-type semiconductor layer includes a microcrystalline silicon structure or an amorphous germanium silicide structure.

In some embodiment, the microcrystalline silicon structure is a semiconductor layer formed by silane and hydrogen via a chemical vapor deposition for film formation, a crystallinity of the microcrystalline silicon structure is greater than 40%, and a band gap of the microcrystalline silicon structure is less than 1.7 eV; or the amorphous germanium silicide structure is an amorphous semiconductor layer formed by silane, hydrogen and germane via a chemical vapor deposition for film formation, and a band gap of the amorphous germanium silicide structure is less than 1.7 eV.

In some embodiment, the photosensitive diode includes a plurality groups of stacked structures, each stack structure includes a p-type semiconductor layer, an i-type semiconductor layer, and an n-type semiconductor layer, and the i-type semiconductor layers of the plurality of groups of stacked structures are made from different materials respectively.

In some embodiment, the p-type semiconductor layer includes a multi-layer structure formed by a first p-type semiconductor layer and a second p-type semiconductor layer, the first p-type semiconductor layer has an amorphoous structure, the second p-type semiconductor layer has a microcrystalline structure, and a doping concentration of the first p-type semiconductor layer is higher than a doping concentration of the second p-type semiconductor layer; and/or, the n-type semiconductor layer includes a multi-layer structure formed by a first n-type semiconductor layer and a second n-type semiconductor layer, the first n-type semiconductor layer has a microcrystalline structure, the second n-type semiconductor layer has an amorphoine structure, and a doping concentration of the second n-type semiconductor layer is higher than a doping concentration of the first n-type semiconductor layer.

In some embodiment, a first optical device disposed on an upper end face of the p-type semiconductor layer is further included. The first optical device is configured to decrease a reflectivity of light on the upper end face of the p-type semiconductor layer or decrease a refraction angle of light in the p-type semiconductor layer to increase an amount of light entering the p-type semiconductor layer.

In some embodiment, a second optical device disposed on a lower surface of the n-type semiconductor layer is further included. The second optical device is configured to increase a reflectivity of light on the lower end face of the n-type semiconductor layer.

In some embodiment, the photosensitive module includes an array formed by photosensitive transistors; the array includes a sensing region, and a photosensitive thin film transistor is disposed in the sensing region and the photosensitive thin film transistor includes a gate, a source, a drain, an insulating layer and a light-absorbing semiconductor layer.

In some embodiment, a main circuit board is further included. A blocking layer is disposed between the photosensitive module and the main circuit board, and the blocking layer is configured to isolate water and oxygen.

In some embodiment, a processor is further included. The processor is configured to generate an infrared image based on the infrared signal detected by the photosensitive module.

In some embodiment, the infrared pixel is configured to emit an infrared signal in response to the apparatus receiving an infrared driving signal.

In some embodiment, the display unit includes an OLED display, a micro LED display or a quantum dot display, the display pixel includes a self-luminous pixel configured to emit a visible light, and the infrared pixel includes a self-luminous pixel configured to emit an infrared light.

In some embodiment, the display unit includes an LCD or an E-ink display, the display unit further includes a backlight unit, the backlight unit is provided with a visible light source and/or an infrared light source, the visible light source and the LCD or the visible light source and the E-ink display are configured to emit the display signal, the infrared light source is configured to emit the infrared signal.

In some embodiment, the photosensitive module is configured to detect the infrared signal emitted from the infrared pixel and scattered by a to-be-detected object.

In order to achieve the above-mentioned purpose, a method for preparing the above-mentioned photosensitive module of the optical detection apparatus is provided. The method includes the following:

forming the gate on a substrate;

forming the gate on the insulation layer;

forming an n-type doped semiconductor layer of the source and the drain, and a metal layer of the source and the drain on the insulation layer, defining the source and the drain with a preset structure, and forming a photosensitive leak current channel between the source and the drain; and forming the light-absorbing semiconductor layer in the photosensitive leak current channel.

In some embodiment, "defining the source and the drain with a preset structure, and forming a photosensitive leak current channel between the source and the drain" includes:

defining a source group and a drain group, wherein each source group includes multiple sources, the multiple sources are connected in parallel; each drain group includes multiple drains, the multiple drains are connected in parallel; a first gap is formed between every two adjacent sources, a drain is disposed in the first gap, a second gap is formed between every two adjacent drains, a source is disposed in the second gap, and the multiple sources and the multiple drains are arranged alternately.

According to the invention, the photosensitive module is disposed below the display unit and is located on or near the optical axis for imaging physiological feature information of the user, so that compared with a structure having a camera separately disposed on a peripheral edge off a display region, the apparatus of the invention can timely capture the physiological feature information (such as eye motion information) of the user, shorten the detection response time and improve user experience. In addition, the photosensitive module is disposed below the display unit, and the display unit with infrared pixels emits infrared light, so that compared with the structure having the camera separately disposed outside the display region, the overall thickness of mobile devices can be effectively decreased, wearable devices or mobile devices become lighter and thinner, and the apparatus is more suitable for flexible wearable devices or mobile devices and can meet market requirements.

DESCRIPTION OF THE PREFERRED EMBODIMENTS

The technical contents, structural features, purposes and effects of the technical solutions are expounded below in conjunction with specific embodiments and accompanying drawings.

Figure 1:
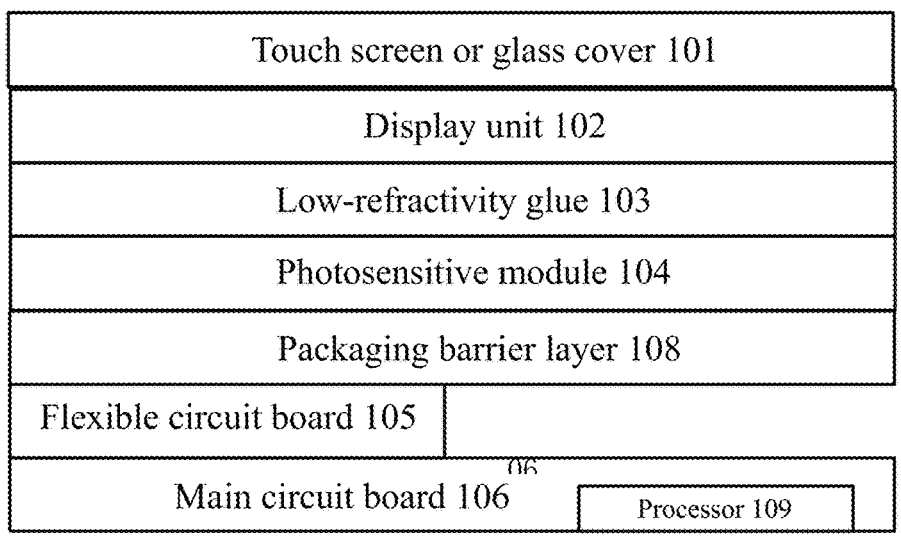
FIG. 1 shows a diagram of the optical detection apparatus of the integrated infrared pixels of the display involved in the embodiment of the present disclosure.

Referring to FIG. 1 which is schematic diagram of a photo-detection apparatus in an embodiment of the invention, the photo-detection apparatus is a facility with a display, such as a smart mobile device like a mobile phone, a tablet computer or a personal digital assistant, or an electronic device like a personal computer or a computer for industrial equipment.

The apparatus sequentially includes, from top to bottom, a display unit 102, a photosensitive module 104 and a processing chip 109. The processing chip 109 is an electronic element with a data processing function, such as a CPU (central processing unit), a DSP (digital signal processor), an MPU (microprocessor). The processing chip is electrically connected to the photosensitive module and the display unit and may be integrated on a main circuit board 106 which is disposed below the display unit. The display unit 102 is a display using an active array thin film transistor for scan driving and data transmission, and is an OLED display, an LCD, a micro LED display, a quantum dot display or an E-ink display.

When the display unit 102 is an LCD or an E-ink display, the display unit includes a backlight unit disposed below the photosensitive module, the photosensitive module is disposed between the backlight unit and the LCD or the E-ink display, and the backlight unit is provided with a visible or infrared light source. Because the LCD and the E-ink display are not self-luminous elements, it is necessary to additionally configure the backlight unit below the photosensitive module to ensure that the display unit is able to emit infrared light. The backlight unit may be a LCD backlight module or other self-luminous electronic elements.

When the display unit 102 is any one of an AMOLED display, a micro LED display and a quantum dot display which are all self-luminous elements, self-luminous visible pixels and/or self-luminous infrared pixels are integrated on the display unit to ensure that the display unit not only has a display function, but also can emit infrared light.

Specifically, the display unit 102 includes P*Q display pixel regions, and display pixel, such as R-pixel component, G-pixel component and B-pixel component, are disposed in each display pixel region; an infrared pixel is disposed in at least one of the P*Q display pixel regions and is used to emit an infrared signal when receiving an infrared display drive signal sent from the processing chip.

The solution of integrating the R-pixel component, the G-pixel component and the B-pixel component on the display has been widely applied and popularized, an innovation of the invention lies in that the infrared pixel is also integrated on the display in a manner similar to the R-pixel component, the G-pixel component and the B-pixel component, and unnecessary details will no longer be given here.

In this embodiment, the infrared pixel may be made of a cyclometalated iridium complex or a cyclometalated osmium complex, and the following paper can be referred to for the solution of making an infrared pixel with these two complexes: "Mohammad taghi sharbati, Farhad panahi, Alireza gharavi, Farzin emami, and Khodabakhsh niknam, "Fabrication of a near infrared OLED," IEEE LEOS Annual Meeting Conference Proceedings, p90 (2009).

In this embodiment, multiple display pixel regions are provided with infrared pixel and are evenly distributed on the display unit. In brief, a display pixel is disposed in each display pixel region, and each display pixel correspondingly displays one pixel of a displayed image. On the basis of traditional display pixel structures having R-pixel component, G-pixel component and B-component integrated therein, the invention makes a further improvement by integrating infrared pixels on one part (at least one) of the display pixel structures with the R-pixel component, the G-pixel component and the B-component, to ensure that the display can emit infrared light.

The infrared pixel are integrated in all or part of the display pixel structures on the display. Considering the production cost, the infrared pixel are preferably integrated in part of the display pixel structures on the display. For example, if a display includes 1000*800 display pixel regions, there will be 1000*800 display structures correspondingly, one infrared pixel may be integrated in one of every 100 display pixel structures, that is, the infrared pixel will be integrated in 10*80 display pixel structures in total, and in this way, the display can emit infrared light.

In some embodiments, a touch screen or a glass cover 101 is disposed over the display unit 102 to satisfy the requirements of different terminal products. Preferably, the light transmittance of the display is greater than 3%, so that the luminous flux of light penetrating through the display during the photo-detection process is large enough to ensure that the light can be received by the photosensitive module below the display, so as to fulfill the photo-detection function.

In some embodiments, a lower end face of the display unit 102 and an upper end face of the photosensitive module 104 are bonded together with low-refractivity glue 103, wherein the refractivity of the low-refractivity glue is less than 1.4. On one hand, the low-refractivity glue has a bonding function to fasten a photosensitive component on a bottom surface of the display unit, so that the photosensitive component will not fall; on the other hand, by adoption of the low-refractivity glue, when light penetrates through the display unit to be irradiated into the photosensitive module, the light will be refracted at the position, where the low-refractivity glue is located, under the refraction of the low-refractivity glue (the refractivity of the glue is less than the refractivity of a part, in contact with the glue, of the photosensitive component, which is greater than 1.4 under normal conditions) so as to enter the photosensitive module as vertically as possible, thus increasing the photoelectric conversion rate. In this embodiment, the low-refractivity glue is organic compound glue with carbon-fluorine bonds.

In some embodiments, the photosensitive module 104 is connected to the main circuit board 106 through a flexible circuit board 105 which includes a chip with an image signal reading and recognition function. The chip with the recognition function is a fingerprint image reading chip, a fingerprint recognition algorithm chip, or the like, such as an ADAS1256 chip produced by Analog Devices. Compared with common hard resin circuit boards, the flexible circuit board, abbreviated as FPC, has the advantages of high wiring density, low weight, small thickness, few wiring space limitations, high flexibility, and the like. By configuring the flexible circuit board, the whole photo-detection apparatus is lighter and thinner and meets market requirements.

In some embodiments, a blocking layer 107 is disposed between the photosensitive module 104 and the main circuit board 106 to block water and oxygen, and the blocking layer includes a material formed by alternately stacking multiple inorganic coatings and multiple organic coatings, and is formed on a polymer substrate. Preferably, the inorganic layers are made of Al2O3, SiOX and SiNX, and the organic layers are made of acrylic resin-based high polymer materials or parylene-based high polymer materials. By adoption of this solution, low-light imaging can be fulfilled in presence of the barrier layer, and the photosensitive module can be manufactured on a substrate suitable for flexible display devices.

In this embodiment, the photosensitive module 104 is a TFT image sensing array film and is used to detect infrared signals, and the processing chip 109 is used to generate infrared image information according to the infrared signals. The photosensitive module includes M*N pixel detection regions. A photosensitive region is disposed corresponding to each pixel detection region, and each photosensitive region includes a pixel circuit constituted by at least one TFT, and a photosensitive component. Each photosensitive region correspondingly detects one pixel, so the TFT image sensing array film can detect M*N pixels to form a corresponding image. The photosensitive component includes an infrared photosensitive diode or an infrared photosensitive transistor, and can detect visible light or infrared light.

Figure 2:
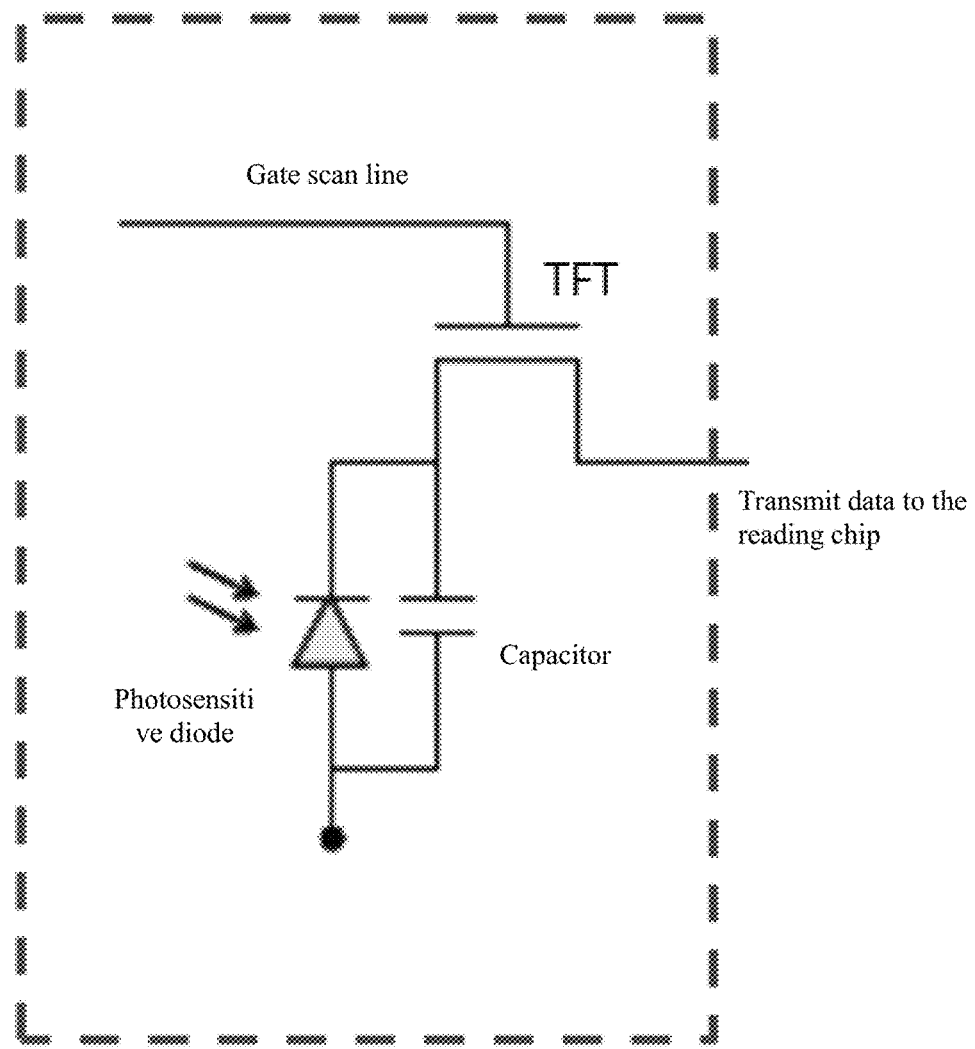
FIG. 2 shows a circuit diagram of the pixel detection area involved in the embodiment of the present disclosure.

For example, in case where the photosensitive module is a photosensitive diode array film, the basic circuit composition of the photosensitive region corresponding to each pixel detection region is shown in FIG. 2. The photosensitive diode serves as the key sensing element of the photosensitive component, and the TFT is operated by a gate scan line at a constant frame rate to be in an ON mode; when the photosensitive module detects a light signal, the TFT is turned on to transmit capacitance and voltage data to the reading chip. See the following literature for more details: M. J. Powell, I. D. French, J. R. Hughes, N. C. Bird, O. S. Davies, C. Glasse, and J. E. Curran, "Amorphous silicon image sensor arrays," Mater. Res. Soc. Symp. Proc., vol. 258, pp. 1127(1992), 【2】B. Razavi, "Design of Analog CMOS Integrated Circuits," McGraw-Hill, 2000.

In this embodiment, the TFT is an organic TFT made of any one of low temperature poly-silicon, indium-gallium-zinc oxide and nanocarbon, and the electron mobility of an array constituted by TFTs is greater than 0.5 cm$^2$/Vs. Low temperature poly-silicon (abbreviated as LTPS, wherein poly-silicon is abbreviated as p-Si, the same below), is a branch of the poly-silicon technique. LCDs adopting poly-silicon liquid crystal materials have many advantages, for example, film circuits can be made thinner and smaller, and power consumption is lower.

Each photosensitive region can be implemented as follows:

Embodiment 1

The TFT image sensing array film (the photosensitive module) is an array formed by photosensitive diodes, and each photosensitive region includes a photosensitive diode sensing region. Existing LCD panels or OLED display panels display pixel arrays thereon by scanning singular pixels under the driving of a TFT structure. The primary structure for turning on or off the TFT is a semiconductor FET, and common semiconductor materials typically include amorphous silicon, poly-silicone, indium gallium zinc oxide (IGZO), organic compounds mixed with carbon nano-materials. Photo-detection diodes can also be made of these semiconductor materials by production equipment compatible with production equipment for TFT arrays, and thus, TFT photo-detection diodes (photosensitive diodes) are being produced in a manner of TFT array in recent years. Please refer to the description of the structure of photosensitive modules in U.S. Pat. No. 6,943,070B2 and Chinese Patent CN204808361U for the specific structure of existing photosensitive diodes. The production process of the TFT image sensing array film differs from the production process of the TFT structure of display panels in that an original pixel open region on the display panels is changed into a photo-sensing region. A substrate for making the TFT may be made of thin glass. Or, the substrate for making the TFT may be made of a high-temperature plastic material, as described in U.S. Pat. No. 6,943,070B2.

Figure 3:
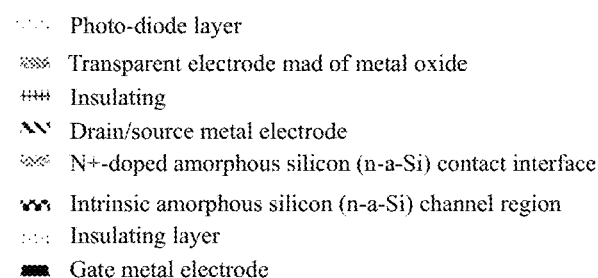
FIG. 3 shows a diagram of the photosensitive region involved in the embodiment of the present disclosure.
Figure 3:
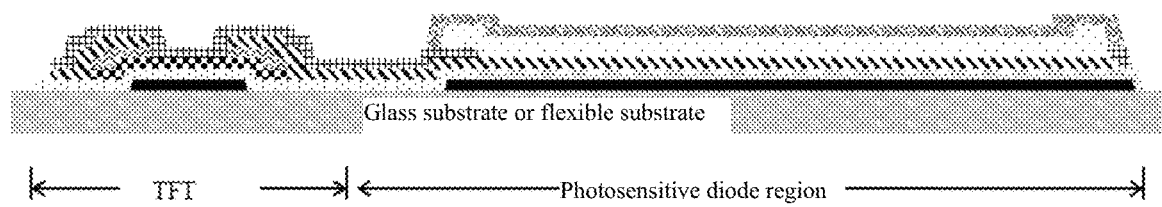

Due to the influences of surrounding ambient light, or the reflection and refraction of visible light emitted by the pixels of the display on existing TFT image sensing array films, optical interference may be caused and may severely affect the signal noise ratio (SNR) of the TFT image sensing array film embedded below the display panel. In order to increase the SNR, as shown in FIG. 3, the photosensitive component in each photosensitive region is further improved to ensure that the TFT image sensing array film can detect and recognize infrared signals reflected by physiological features (such as the eyes) of users. The specific structure is as follows:

The photosensitive diode layer includes at least one p-type semiconductor layer, at least one i-type semiconductor layer and at least one n-type semiconductor layer which are stacked together. For example, the photosensitive diode layer may include a first p-type semiconductor layer, a first i-type semiconductor layer, a first n-type semiconductor layer, a second p-type semiconductor layer, a second i-type semiconductor layer and a second n-type semiconductor layer which are sequentially stacked from top to bottom, wherein the i-type semiconductor layers are microcrystalline silicon structures or amorphous germanium silicide structures. The microcrystalline silicon structures are semiconductor layers formed by silane and hydrogen which are subjected to chemical vapor deposition for film formation, the degree of crystallinity of the microcrystalline silicon structures is greater than 40%, and the band gap of the microcrystalline silicon structures is less than 1.7 eV. The amorphous germanium silicide structures are amorphous semiconductor layers formed by silane, hydrogen and germane which are subjected to chemical vapor deposition for film formation, and the band gap of the amorphous germanium silicide structures is less than 1.7 eV.

Band gap refers to the width of one band gap (unit: eV). The energy of electrons in solids are discontinuous energy bands which cannot be continuously valued, the existence of free electrons is necessary to realize electric conduction, energy bands with free electrons are called conduction bands (conductive), to turn into free electrons, bonded electrons need to acquire sufficient energy to jump from valance bands to the conduction bands, and the minimum value of the energy is the band gap. The band gap, as one important characteristic parameter of semiconductors, mainly depends on the structure of energy bands of the semiconductors, that is, the band gap is associated with crystal structures and atom bonding properties.

At the room temperature (300K), the band gap of germanium is about 0.66 eV. Silane contains germanium, so that the band gap of the i-type semiconductor layers doped with germanium will be decreased. When the band gap is less than 1.7 eV, it indicates that i-type semiconductor layers can receive light signals from visible wavelength to infrared (or near-infrared) wavelength. The operating wavelength of the photosensitive diode including the amorphous or microcrystalline germanium silicide structures can be expanded to 600 nm-2000 nm by controlling the GeH4 concentration for chemical vapor deposition.

Embodiment 2

On the basis of Embodiment 1, to improve the quantum efficiency of photovoltaic conversion, the photosensitive diode including the amorphous germanium silicide structures may also be formed by stacking two or more junction layers of P-type/i-type/n-type structures. The p-type/i-type/n-type structures on a first junction layer of the photosensitive diode are amorphous silicon structures, and the p-type/i-type/n-type structures on the second junction layer or above may be microcrystalline structures, polycrystalline structures or materials doped with compounds beyond an extendable photosensitive wavelength range. In brief, multiple sets of p-type/i-type/n-type structures may be vertically stacked to form the photosensitive diode, and each p-type/i-type/n-type structure is the same as that mentioned in the description of the photosensitive diode in Embodiment 1.

Embodiment 3

On the basis of Embodiment 1 or Embodiment 2, as for each p-type/i-type/n-type structure, more than two p-type semiconductor layers are configured. For example, three p-type semiconductor layers, namely a first p-type semiconductor layer (p1 layer), a second p-type semiconductor layer (p2 layer) and a third p-type semiconductor layer (p3 layer) from top to bottom, are configured, wherein, the p1 layer is an amorphous structure and is heavily doped with boron (the boron concentration thereof is more than twice the standard concentration), and the p2 layer and the p3 layer are microcrystalline structures and are normally doped with boron (in accordance with the standard concentration); the p2 layer and the p3 layer having their thicknesses been decreased will absorb less light, so light can enter and be absorbed by the i-type layers as much as possible, thus increasing the photovoltaic conversion rate; in addition, the p2 layer and the p3 layer are normally doped with boron, so that the degradation of a built-in potential caused by heavy doping of the p1 layer can be effectively avoided. A case where other numbers of p-type semiconductor layers are configured is similar to the case mentioned herein, and will not be detailed anymore.

Similarly, more than two n-type semiconductor layers may be configured. For example, three n-type semiconductor layers, namely a first n-type semiconductor layer (n1 layer), a second n-type semiconductor layer (n2 layer) and a third n-type semiconductor layer (n3 layer) from top to bottom, are configured, wherein the n3 layer is an amorphous structure and is heavily doped with phosphorus (the phosphorus content is more than twice the standard phosphorus content); the n1 layer and the n2 layer are microcrystalline structures and are normally doped with phosphorus (in accordance with the standard production process); the n1 layer and the n2 layer having their thicknesses been decreased can absorb less light, so light can enter and be absorbed by the i-type layers as much as possible, thus increasing the photovoltaic conversion rate; in addition, the n1 layer and the n2 layer are normally doped with phosphorus, so that the degradation of a built-in potential caused by heavy doping of the n3 layer can be effectively avoided. The case where other numbers of n-type semiconductor layer are configured is similar to the case mentioned herein, and will not be detailed anymore.

Embodiment 4

Figure 6:
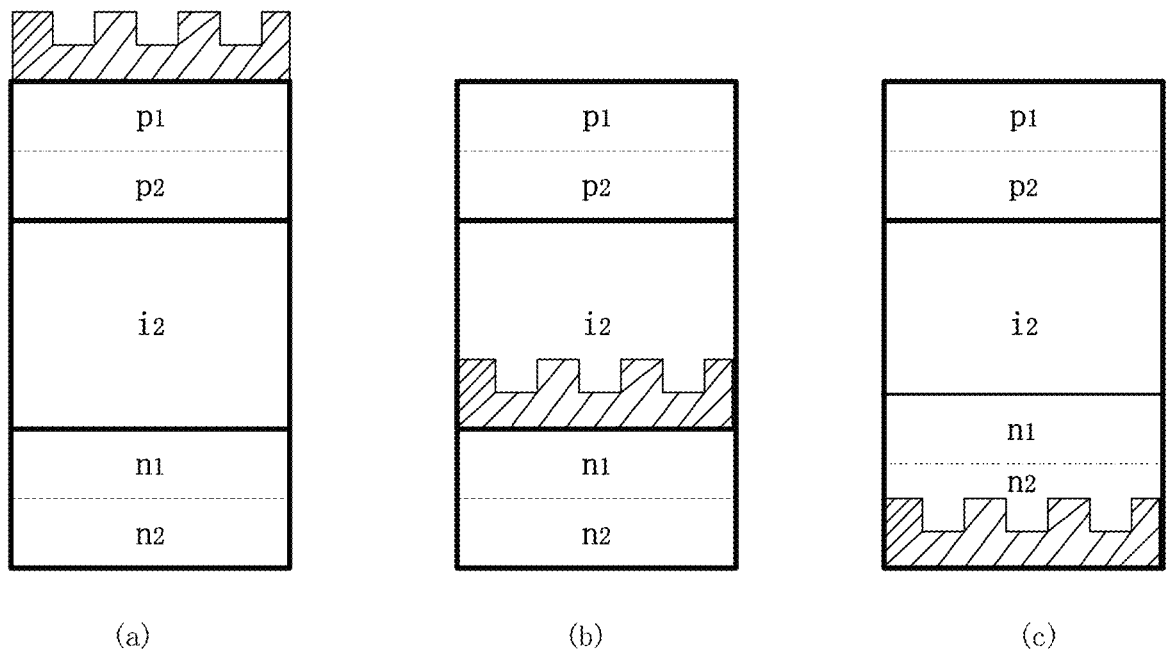
FIG. 6 shows a diagram of the distribution of optics involved in the embodiment of the present disclosure.

This embodiment is a further improvement on Embodiment 1, Embodiment 2 or Embodiment 3. Specifically, as shown in FIG. 6 (*a*), a first optical device is disposed on an upper end face of the p-type semiconductor layer and is used to decrease the reflectivity of light on the upper end face of the p-type semiconductor layer or decrease the refraction angle of light on the p-type semiconductor layer so as to increase the amount of incident light. By decreasing the refraction angle of light on the p-type semiconductor layer, light can enter the p-type semiconductor layer as vertically as possible so as to be absorbed by the i-type semiconductor layer below the p-type semiconductor layer as much as possible, thus further increasing the photovoltaic conversion rate of the photosensitive diode. When multiple p-type semiconductor layers are configured, the first optical device is disposed on the upper end face of the top p-type semiconductor layer.

The first optical device includes a photonic crystal structure or micro-lens array structure with the refractivity varying periodically, or a diffuse scattering structure with the refractivity varying aperiodically. The refractivity of the first optical device is smaller than that of the p-type semiconductor layer, so that after light is refracted by the first optical device, the incident angle will be smaller than the refraction angle to allow light to enter the p-type semiconductor layer as vertically as possible.

Embodiment 5

This embodiment is a further improvement on Embodiment 1, Embodiment 2, Embodiment 3 or Embodiment 4. As shown in FIG. 6(*b*)(*c*), a second optical device is disposed on a lower end face of the n-type semiconductor layer and is used to increase the multi-reflectivity of light on the lower end face of the n-type semiconductor layer. Multi-reflectivity means that light is refracted by the second optical device, then enters and is absorbed by the i-type semiconductor layer, and is then reflected by the second optical device again to enter the i-type semiconductor layers, and so forth, and in this way, the photovoltaic conversion rate of the i-type semiconductor layer is increased. When multiple n-type semiconductor layers are configured, the second optical device is disposed on the lower end face of the bottom n-type semiconductor layer.

The second optical device includes a photonic crystal structure with the refractivity varying periodically, or a diffuse scattering structure with the refractivity varying aperiodically. The refractivity of the second optical device is less than that of the n-type semiconductor layer, so that light can be reflected on the lower end face of the n-type semiconductor layer to the maximum extent to be absorbed by the i-type semiconductor layer, signals within the wavelength range of light capable of being absorbed by the i-type semiconductor layer are properly amplified, and the amount of photocurrents within the wavelength range is increased.

Embodiment 6

Figure 4:
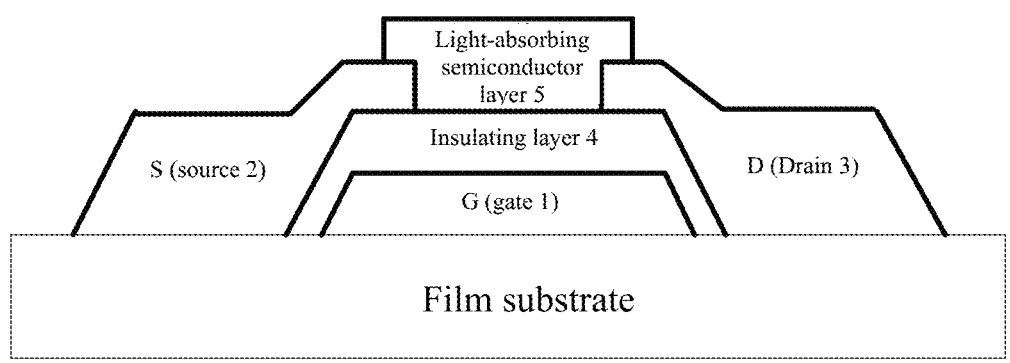
FIG. 4 shows a diagram of the photosensitive region involved in another embodiment of the present disclosure.

As shown in FIG. 4, the TFT image sensing array film (photosensitive module) is an array formed by photosensitive transistors. The photosensitive component in each photosensitive region includes a photosensitive TFT which includes a gate 1, a source 2, a drain 3, an insulating layer 4 and a light-absorption semiconductor layer 5. The photosensitive TFT is an inverted coplanar structure including the gate 1, the insulating layer 4 and the source 2 which are sequentially arranged from bottom to top. The drain 3 and the source 2 are horizontally coplanar. The gate 1 is wrapped in the insulating layer 4 to be prevented against contact with the source 2 and the drain 3. The source 2 is in clearance fit with the drain 3. A photosensitive leak current channel is horizontally formed between the source 2 and the drain 3, and the light-absorption semiconductor layer 5 is disposed in the photosensitive leak current channel.

When the TFT is operated to an off state under the control of a gate voltage, there will be no current between the source and the drain. When the TFT is irradiated by light, electron-hole pairs will be excited on the semiconductor by the energy of light and will be separated under the field effect of the TFT structure, so that photosensitive leak currents are generated by the TFT. TFT arrays with the property of photosensitive leak currents can be applied to photo-detection or photo-detection techniques. Compared with common devices using TFTs with leak currents as photosensitive TFTs, the light-absorption semiconductor layer is configured at the top light-absorption layer by means of the inverted coplanar FTE structure, so that electron excitation is greatly improved, and the photoelectric conversion efficiency is improved.

Figure 7:
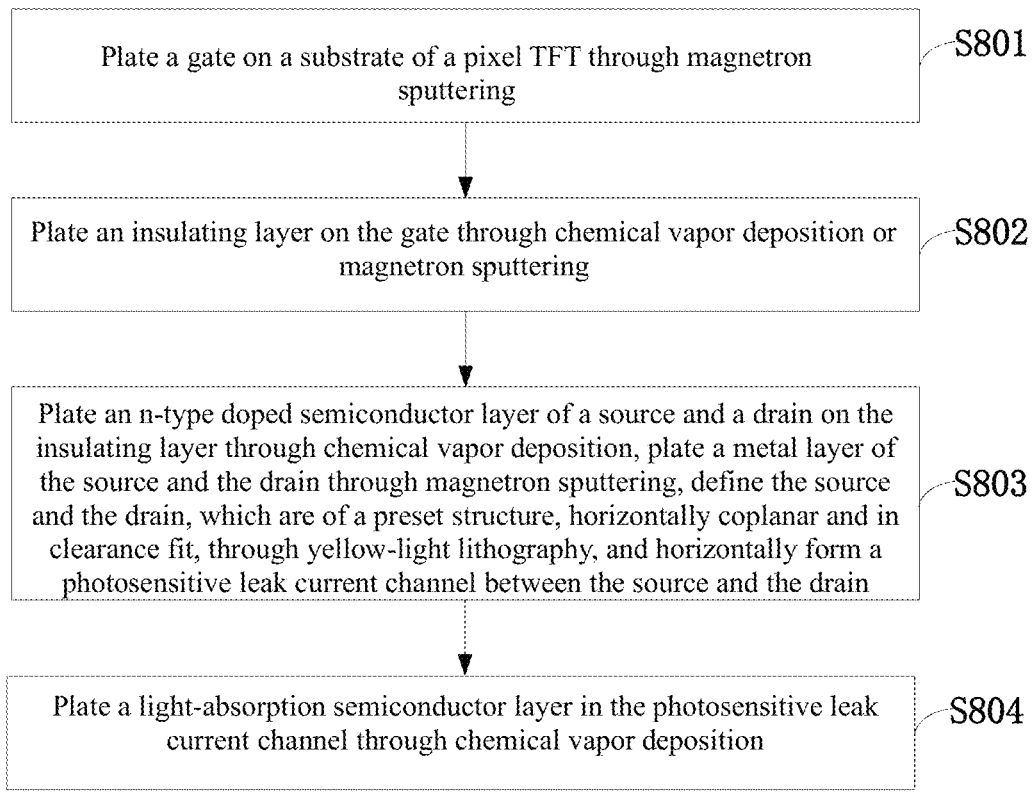
FIG. 7 is a flowchart of the preparation method of the photosensitive module involved in the embodiment of the present disclosure.
Figure 8:
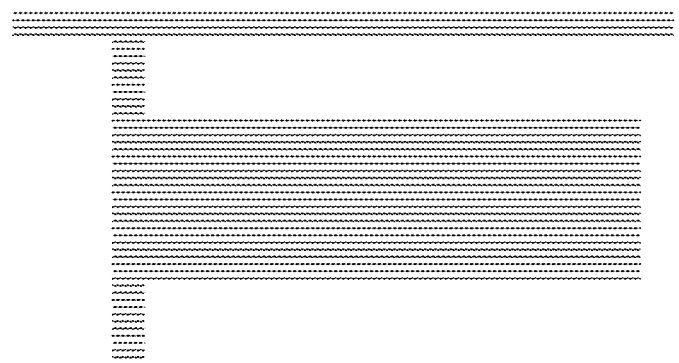
FIG. 8 shows a diagram in the preparation of the photosensitive module as described in the embodiment of the present disclosure.
Figure 8:
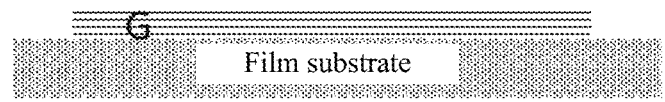
Figure 9:
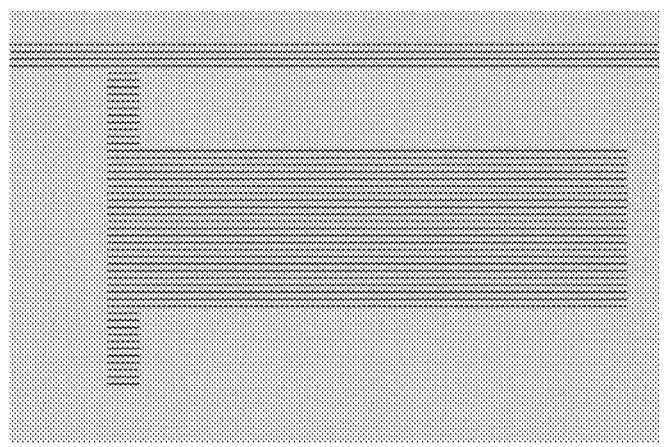
FIG. 9 shows a diagram in the preparation of the photosensitive module described in another embodiment of the present disclosure.
Figure 9:
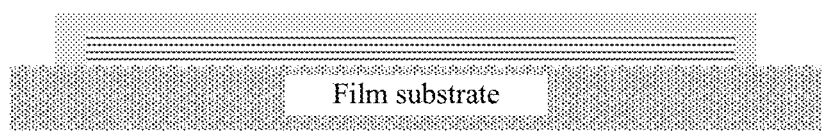
Figure 10:
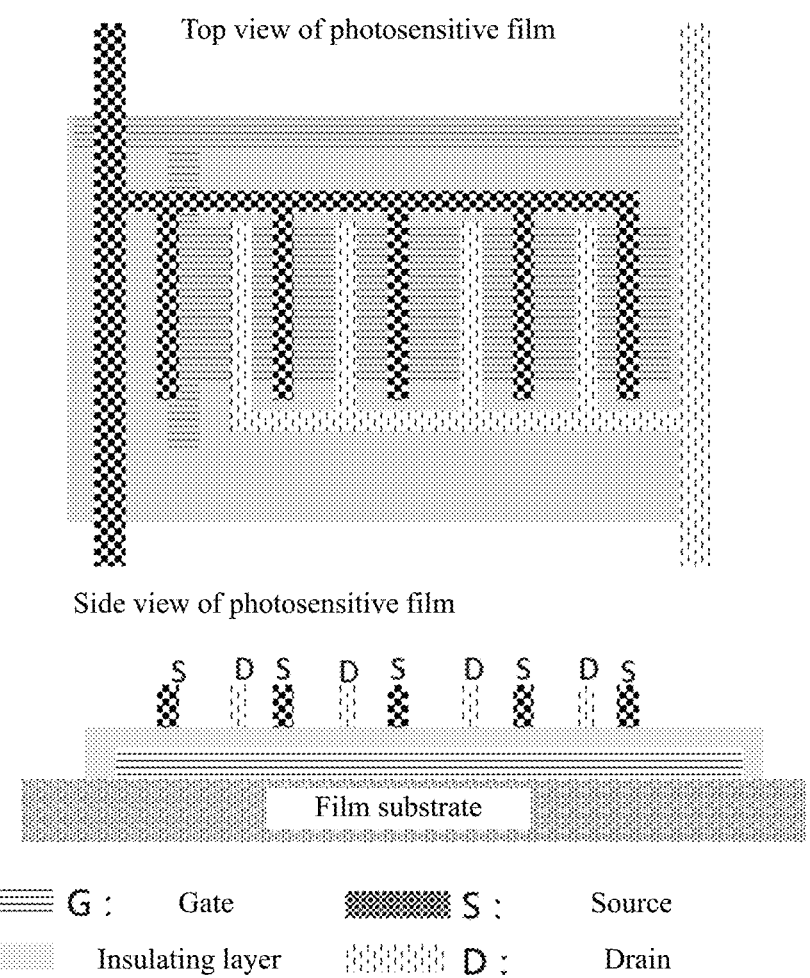
FIG. 10 shows a diagram in the preparation process of the photosensitive module described in another embodiment of the present disclosure.
Figure 11:
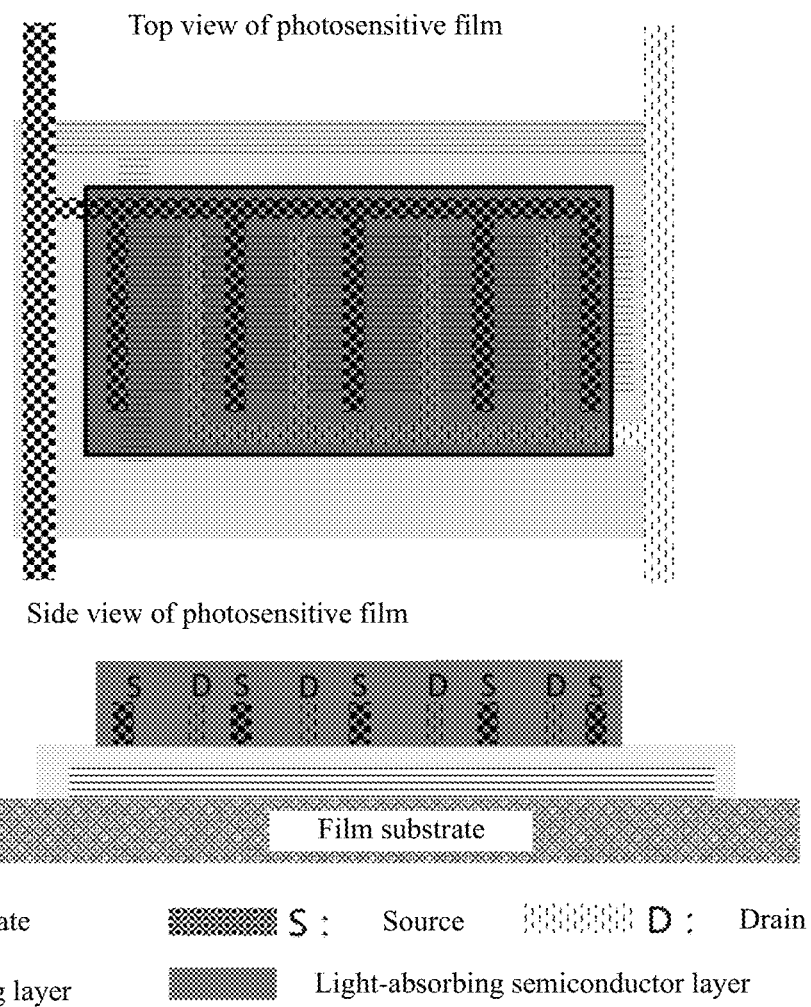
FIG. 11 shows a diagram in the preparation process of the photosensitive module described in another embodiment of the present disclosure.

As shown in FIG. 7 which is a flow diagram of a method for manufacturing the photosensitive component in one embodiment of the invention. The method is used for manufacturing the photosensitive TFT of the photosensitive component in Embodiment 6, and specifically includes the following steps:

Step S801: the gate is plated on a substrate of a pixel TFT through magnetron sputtering, wherein the substrate of the pixel TFT is made of a hard board or a flexible material (such as polyimide);

Step S802: the insulating layer is plated on the gate through chemical vapor deposition or magnetron sputtering;

Step S803, n-type doped semiconductor layers of a source and a drain are plated on the insulating layer through chemical vapor deposition, metal layers of the source and the drain are plated through magnetron sputtering, the source and the drain, which are of a preset structure, horizontally coplanar and in clearance fit, are defined through yellow-light lithography, and a photosensitive leak current channel is horizontally formed between the source and the drain; and Step S804: a light-absorption semiconductor layer is plated in the photosensitive leak current channel through chemical vapor deposition.

Embodiment 7

Regarding a common FET structure, a current collection structure between the source and the drain of the TFT, used for scan driving and a data transmission, does not need to be specially designed. However, when the FET is used for detecting photosensitive leak currents, after the electron-hole pairs excited by light are separated under the field effect, it is quite likely that photoelectrons will undergo recombination with holes or be captured by dangling bonds of the light-absorption semiconductor layer before arriving an electrode if the drift path of the separated electron-hole pairs is too long, and thus it is impossible to make a contribution to outputting photocurrents for photo-detection.

To reduce the influences of the length of the channel between the source and the drain on photosensitive leak currents to enlarge the area of the light-absorption conductor without compromising the photoelectric conversion efficiency, the source and the drain in Embodiment 4 are further improved in this embodiment, and a novel structure of the source and the drain is provided.

Figure 5:
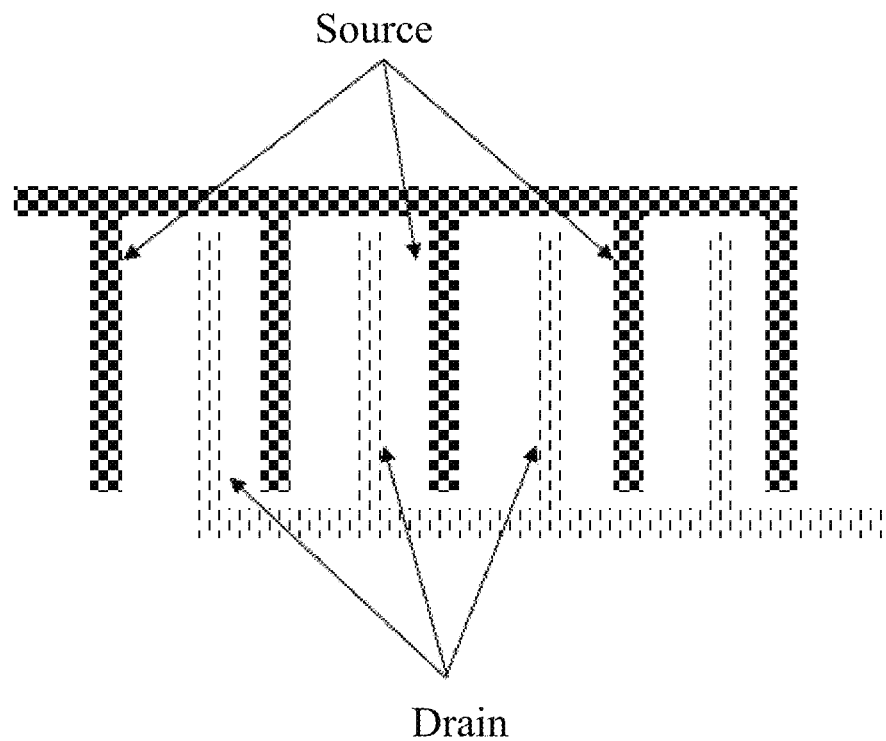
FIG. 5 shows a diagram of the source and leakage structures involved in the embodiment of the present disclosure.

As shown in FIG. 5, multiple sources and multiple drains are configured, wherein the sources are connected in parallel, and the drains are connected in parallel; the sources are in clearance fit with the drains, and a photosensitive leak current channel is horizontally formed between the sources and the drains in such as manner: a first gap is formed between every two adjacent sources, one drain is disposed in the first gap, a second gap is formed between every two adjacent drains, one source is disposed in the second gap, and the sources and the drains are arranged alternately and are in clearance fit. The distance between each source and the adjacent drain is smaller than an electron drift distance which refers to a distance that electrons can survive under the field effect. In this way, the multiple sources in each detection pixel are connected in parallel, and the multiple drains in each detection pixel are also connected in parallel, so that the probability of recombination of excited electrons and holes can be effectively decreased, the success rate of photoelectron collection of electrodes under the field effect is increased, and the light sensitivity of the leak-current photosensitive TFT is optimized.

As shown in FIG. 8 to FIG. 11 which illustrates a process of manufacturing the photosensitive TFT of the photosensitive component in Embodiment 7 step by step, the steps for manufacturing the photosensitive TFT are approximately identical with the steps for manufacturing the photosensitive FTF in Embodiment 6. The difference lies in that when the sources and the drains are manufactured, Step S803 "the source and the drain, which are of a preset structure, horizontally coplanar and in clearance fit, are defined through yellow-light lithography, and a photosensitive leak current channel is between the source and the drain horizontally" is replaced with: source groups and drain groups are defined through yellow-light lithography, wherein each source group includes multiple sources which are connected in parallel; each drain group includes multiple drains which are connected in parallel; a gap is formed between every two adjacent sources, one drain is disposed in the first gap, a second gap is formed between every two adjacent drains, one source is disposed in the second gap, and the sources and the drains are arranged alternately and are in clearance fit.

In some embodiments, the photosensitive module is used to receive a detection trigger signal to be switched in a photo-detection state, receives a light signal reflected by a to-be-detected object (such as fingerprint, eye and iris) to capture information of the to-be-detected part of the user, and outputs a corresponding image. Preferably, the detection trigger signal is an infrared detection signal; after receiving the signal, the photosensitive module will be switched to the detection state to detect infrared light reflected into the photosensitive module. The infrared pixel on the display emits infrared light after receiving an infrared display drive signal, or stops working after receiving an infrared display off signal, and in this case, the display unit only displays RGB pixel components.

Figure 12:
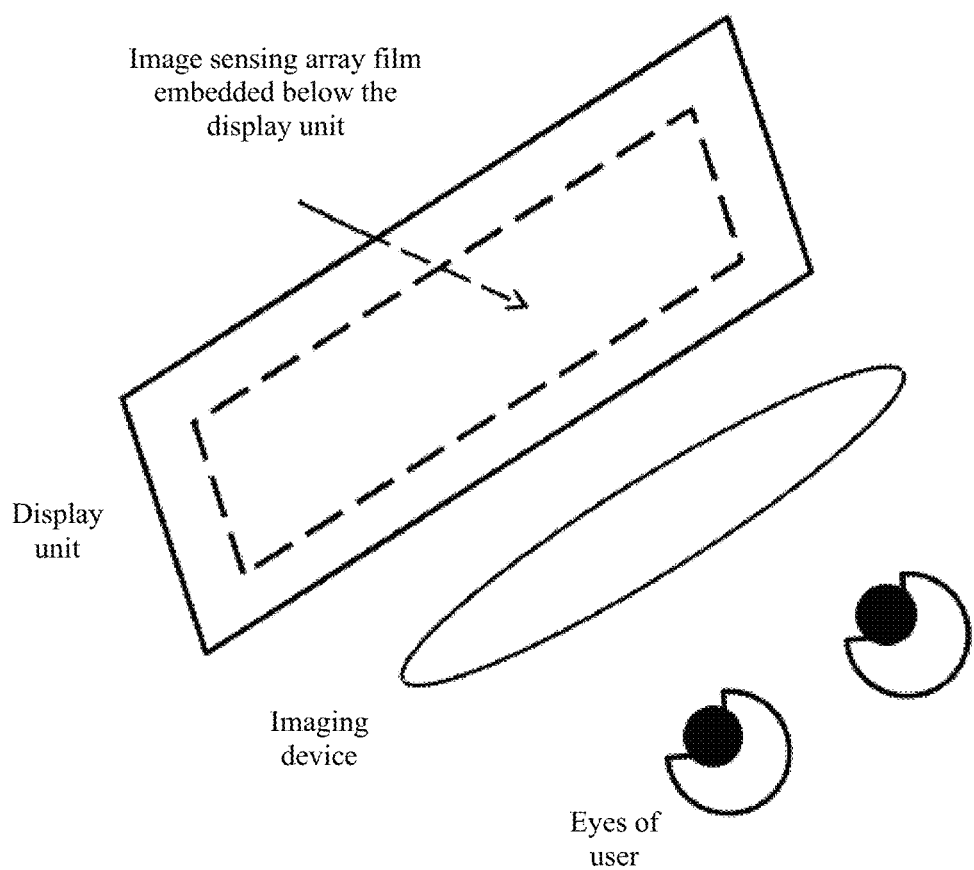
FIG. 12 shows a diagram of the application scenario of an optical detection apparatus with integrated infrared pixels in the display involved in the embodiment of the present disclosure.

In some embodiments, the display unit has a photo-detection sensing region which includes multiple photo-detection sensing sub-regions, and a photosensitive module is correspondingly arranged below each photo-detection sensing sub-region. The apparatus further includes a storage medium having a computer program stored therein. For example, when the apparatus is used to track and recognize motions of eyes, the computer program is executed by a processor to implement the following steps: when an instruction for starting eye recognition sub-regions (the photo-detection sensing sub-regions) is received, starting the photosensitive modules below the eye recognition sub-regions (the photo-detection sensing sub-regions) by a detection control circuit; or, when an instruction for turning off the eye recognition sub-regions is received, starting the photosensitive modules below the eye recognition sub-regions by the detection control circuit. As shown in FIG. 12, the area of the photosensitive modules may equal to the total area of the display or account for ½-¾ of the total area of the display. The specific area of the photosensitive modules should be set as actually needed, and the center of the photosensitive modules overlaps with the center of the display to ensure that the optical axis will not deviate when physiological feature information is detected.

According to the invention, the photosensitive module is disposed below the display unit and is located on or near the optical axis for imaging of physiological feature information of the user, so that compared with a structure having a camera separately disposed on the peripheral edge of a display, the apparatus of the invention can timely capture the physiological feature information (such as eye motion information) of the user, shorten the detection response time and improve user experience. In addition, the photosensitive module is disposed below the display unit, and the display unit with infrared pixels emits infrared light, so that compared with the structure having camera separately disposed outside the display, the overall thickness of mobile devices can be effectively decreased, wearable devices or mobile devices are lighter and thinner, and the apparatus is more suitable for flexible wearable devices or mobile devices, and can meet market requirements.

Although the above embodiments have been described, those skilled in the art can make other changes and modifications to these embodiments once they have learned the basic inventive concept. Therefore, the above descriptions are only the embodiments of the present disclosure and does not limit the patent protective scope of the present disclosure. Similarly, any equivalent structure or equivalent process transformation made by using the present specification and the drawings, or directly or indirectly applied to other relevant technical fields, shall be included in the patent protective scope of the present disclosure.

I claim:

1. An optical detection apparatus comprising a display unit, a photosensitive module and a processing chip;
    wherein the display unit is disposed above the photosensitive module, the display unit comprises a plurality of pixel regions, the pixel region is provided with a display pixel, at least one of the plurality of pixel regions comprises an infrared pixel, the display pixel is configured to emit a display signal, and the infrared pixel is configured to emit an infrared signal after receiving infrared pixel driving signal;
    the photosensitive module is configured to detect the infrared signal; and the processing chip is configured to generate infrared image information according to the infrared signal detected by the photosensitive module.

2. The optical detection apparatus according to claim 1, wherein the photosensitive module comprises multiple photosensitive regions, every photosensitive region comprises a pixel circuit and a photosensitive component.

3. The optical detection apparatus according to claim 2, wherein the photosensitive component comprises an infrared photosensitive diode or an infrared photosensitive transistor, and/or the pixel circuit comprises at least one thin film transistor.

4. The optical detection apparatus according to claim 1, wherein more than one of the plurality of the pixel regions comprises the infrared pixel.

5. The optical detection apparatus according to claim 1, wherein the display pixel comprises RGB pixel components.

6. The optical detection apparatus according to claim 2, wherein the photosensitive component comprises a photosensitive diode, the photosensitive diode comprises a p-type semiconductor layer, an i-type semiconductor layer and an n-type semiconductor layer which are stacked from top to bottom, and the i-type semiconductor layer comprises a microcrystalline silicon structure or an amorphous germanium silicide structure.

7. The optical detection apparatus according to claim 6, wherein the microcrystalline silicon structure is a semiconductor layer formed by silane and hydrogen via a chemical vapor deposition for film formation, a crystallinity of the microcrystalline silicon structure is greater than 40%, and a band gap of the microcrystalline silicon structure is less than 1.7 eV; or the amorphous germanium silicide structure is an amorphous semiconductor layer formed by silane, hydrogen and germane via a chemical vapor deposition for film formation, and a band gap of the amorphous germanium silicide structure is less than 1.7 eV.

8. The optical detection apparatus according to claim 6, wherein the photosensitive diode comprises a plurality groups of stacked structures, each stack structure comprises a p-type semiconductor layer, an i-type semiconductor layer, and an n-type semiconductor layer, and the i-type semiconductor layers of the plurality of groups of stacked structures are made from different materials respectively.

9. The optical detection apparatus according to claim 6, wherein the p-type semiconductor layer comprises a multi-layer structure formed by a first p-type semiconductor layer and a second p-type semiconductor layer, the first p-type semiconductor layer has an amorphous structure, the second p-type semiconductor layer has a microcrystalline structure, and a doping concentration of the first p-type semiconductor layer is higher than a doping concentration of the second p-type semiconductor layer; and/or, the n-type semiconductor layer comprises a multi-layer structure formed by a first n-type semiconductor layer and a second n-type semiconductor layer, the first n-type semiconductor layer has a microcrystalline structure, the second n-type semiconductor layer has an amorphoine structure, and a doping concentration of the second n-type semiconductor layer is higher than a doping concentration of the first n-type semiconductor layer.

10. The optical detection apparatus according to claim 6, further comprising a first optical device disposed on an upper end face of the p-type semiconductor layer, wherein the first optical device is configured to decrease a reflectivity of light on the upper end face of the p-type semiconductor layer or decrease a refraction angle of light in the p-type semiconductor layer to increase an amount of light entering the p-type semiconductor layer.

11. The optical detection apparatus according to claim 6, further comprising a second optical device disposed on a lower surface of the n-type semiconductor layer, wherein the second optical device is configured to increase a reflectivity of light on the lower end face of the n-type semiconductor layer.

12. The optical detection Apparatus according to claim 1, wherein the photosensitive module comprises an array formed by photosensitive transistors; the array comprises a sensing region, and a photosensitive thin film transistor is disposed in the sensing region and the photosensitive thin film transistor comprises a gate, a source, a drain, an insulating layer and a light-absorbing semiconductor layer.

13. The optical detection apparatus according to claim 1, further comprising a main circuit board, wherein a blocking layer is disposed between the photosensitive module and the main circuit board, and the blocking layer is configured to isolate water and oxygen.

14. The optical detection apparatus according to claim 1, further comprising a processor, wherein the processor is configured to generate an infrared image based on the infrared signal detected by the photosensitive module.

15. The optical detection apparatus according to claim 1, wherein the infrared pixel is configured to emit an infrared signal in response to the apparatus receiving an infrared driving signal.

16. The optical detection apparatus according to claim 1, wherein the display unit comprises an OLED display, a micro LED display or a quantum dot display, the display pixel comprises a self-luminous pixel configured to emit a visible light, and the infrared pixel comprises a self-luminous pixel configured to emit an infrared light.

17. The optical detection apparatus according to claim 1, wherein the display unit comprises an LCD or an E-ink display, the display unit further comprises a backlight unit, the backlight unit is provided with a visible light source and/or an infrared light source, the visible light source and the LCD or the visible light source and the E-ink display are configured to emit the display signal, the infrared light source is configured to emit the infrared signal.

18. The optical detection apparatus according to claim 1, wherein the photosensitive module is configured to detect the infrared signal emitted from the infrared pixel and scattered by a to-be-detected object.

19. A method for preparing a photosensitive module of an optical detection apparatus, the optical detection apparatus comprising a display unit, the photosensitive module and a processing chip; wherein the display unit is disposed above the photosensitive module, the display unit comprises a plurality of pixel regions, the pixel region is provided with a display pixel, at least one of the plurality of pixel regions comprises an infrared pixel, the display pixel is configured to emit a display signal, and the infrared pixel is configured to emit an infrared signal after receiving infrared pixel driving signal; the photosensitive module is configured to detect the infrared signal; and the processing chip is configured to generate infrared image information according to the infrared signal detected by the photosensitive module; wherein the photosensitive module comprises an array formed by photosensitive transistors; the array comprises a sensing region, and a photosensitive thin film transistor is disposed in the sensing region and the photosensitive thin film transistor comprises a gate, a source, a drain, an insulating layer and a light-absorbing semiconductor layer, the method comprising:

forming the gate on a substrate;

forming the gate on an insulation layer;

forming an n-type doped semiconductor layer of the source and the drain, and a metal layer of the source and the drain on the insulation layer, defining the source and the drain with a preset structure, and forming a photosensitive leak current channel between the source and the drain; and forming the light-absorbing semiconductor layer in the photosensitive leak current channel.

20. The method for preparing the photosensitive module according to claim 19, wherein "defining the source and the drain with a preset structure, and forming a photosensitive leak current channel between the source and the drain" comprises: defining a source group and a drain group, wherein each source group comprises multiple sources, the multiple sources are connected in parallel; each drain group comprises multiple drains, the multiple drains are connected in parallel; a first gap is formed between every two adjacent sources, a drain is disposed in the first gap, a second gap is formed between every two adjacent drains, a source is disposed in the second gap, and the multiple sources and the multiple drains are arranged alternately.

* * * * *